US012671038B2

(12) United States Patent
Sato et al.

(10) Patent No.: US 12,671,038 B2
(45) Date of Patent: Jun. 30, 2026

(54) INTEGRATED CAPACITOR AND METHOD OF MANUFACTURING INTEGRATED CAPACITOR

(71) Applicant: Murata Manufacturing Co., Ltd., Nagaokakyo (JP)

(72) Inventors: Tomohiko Sato, Nagaokakyo (JP); Mariko Takahashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 423 days.

(21) Appl. No.: 18/086,885

(22) Filed: Dec. 22, 2022

(65) Prior Publication Data

US 2023/0119863 A1 Apr. 20, 2023

Related U.S. Application Data

(63) Continuation of application No. PCT/JP2022/008893, filed on Mar. 2, 2022.

(30) Foreign Application Priority Data

Apr. 30, 2021 (JP) ................................. 2021-077659

(51) Int. Cl.
*H01G 9/012* (2006.01)
*H01G 9/00* (2006.01)
(Continued)

(52) U.S. Cl.
CPC ........... *H01G 9/0029* (2013.01); *H01G 9/012* (2013.01); *H01G 9/15* (2013.01); *H01G 9/26* (2013.01)

(58) Field of Classification Search
CPC .......... H01G 9/15; H01G 9/0029; H01G 9/26; H01G 9/012; H01G 4/232; H01G 4/248; H01G 4/228
(Continued)

(56) References Cited

U.S. PATENT DOCUMENTS 11,469,053 B2 10/2022 Furukawa et al.
11,756,733 B2 * 9/2023 Chigira .................. H01G 4/232
361/301.4
(Continued)

FOREIGN PATENT DOCUMENTS

CN 112243529 A 1/2021
JP 2001007531 A 1/2001
(Continued)

OTHER PUBLICATIONS

International Search Report in PCT/JP2022/008893, mailed May 17, 2022, 3 pages.

*Primary Examiner* — Arun Ramaswamy
(74) *Attorney, Agent, or Firm* — ArentFox Schiff LLP

(57) ABSTRACT

An integrated capacitor that includes a plurality of capacitor elements, each of which has one of first internal electrodes and one of second internal electrodes; an exterior body accommodating the plurality of capacitor elements; a plurality of first external electrode layers on an outer surface of the exterior body and electrically connected to the first internal electrodes; and a plurality of second external electrode layers on the outer surface of the exterior body and electrically connected to the second internal electrodes. One of the first external electrode layers has a projecting portion projecting outward or a recessed portion recessed inward from part of an outer edge of the first external electrode layer in a plan view in a thickness direction of the first external electrode layer.

11 Claims, 9 Drawing Sheets

(51) Int. Cl.
    *H01G 9/15*          (2006.01)
    *H01G 9/26*          (2006.01)

(58) Field of Classification Search
    USPC .................. 361/541, 434, 540, 306.3, 321.3
    See application file for complete search history.

(56)                 References Cited

U.S. PATENT DOCUMENTS

| | | | |
|---|---|---|---|
| 2004/0246690 A1* | 12/2004 | Nakamura ........ | H01L 23/49827<br>257/E21.511 |
| 2005/0269287 A1* | 12/2005 | Tsujimura .............. | H05K 1/162<br>216/13 |
| 2006/0120014 A1 | 6/2006 | Nakamura et al. | |
| 2008/0037199 A1* | 2/2008 | Fukudome ............. | H05K 1/185<br>29/25.42 |
| 2016/0086732 A1* | 3/2016 | Kishida ................... | C03C 3/091<br>361/301.4 |
| 2016/0262260 A1 | 9/2016 | Oyamada et al. | |
| 2021/0082625 A1* | 3/2021 | Fujita ..................... | H01G 4/232 |
| 2021/0082630 A1 | 3/2021 | Furukawa et al. | |

FOREIGN PATENT DOCUMENTS

| | | |
|---|---|---|
| JP | 2003272957 A | 9/2003 |
| JP | 2004031641 A | 1/2004 |
| JP | 2006147606 A | 6/2006 |
| WO | 2011086796 A1 | 7/2011 |
| WO | 2015060216 A1 | 4/2015 |

* cited by examiner

INTEGRATED CAPACITOR AND METHOD OF MANUFACTURING INTEGRATED CAPACITOR

CROSS REFERENCE TO RELATED APPLICATIONS

The present application is a continuation of International application No. PCT/JP2022/008893, filed Mar. 2, 2022, which claims priority to Japanese Patent Application No. 2021-077659, filed Apr. 30, 2021, the entire contents of each of which are incorporated herein by reference.

FIELD OF THE INVENTION

The present invention relates to an integrated capacitor and a method of manufacturing an integrated capacitor.

BACKGROUND OF THE INVENTION

Patent Document 1 discloses a solid electrolytic capacitor in which a valve metal porous portion is provided on at least one surface of each conductor having been divided by vertical and horizontal grooves to form a first electrode, a dielectric film is provided on the surface of at least the valve metal porous portion, a solid electrolyte layer is provided on this dielectric film, a current collector layer is provided on this solid electrolyte layer, part of the conductor is provided with a through-hole having an inner wall on which an insulating layer is formed, an extended electrode as a second electrode electrically connected to the current collector layer and exposed to the terminal electrode of the first electrode is provided in this through-hole, and insulating portions for division into individual capacitor elements, each of which includes the first electrode, the dielectric film, the solid electrolyte layer, the current collector layer, and the extended electrode are provided in the grooves.

Patent Document 1: Japanese Unexamined Patent Application Publication No. 2003-272957

SUMMARY OF THE INVENTION

In an electrolytic capacitor such as a solid electrolytic capacitor, defective portions having a small film thickness are inevitably generated in the oxide film (dielectric film) formed on the surface of an anode, which is an internal electrode, in the manufacturing process. Therefore, a leak current is generated in defective portions. In the worst case, dielectric breakdown occurs starting at the defective portions, and the capacitor may fail during use. Therefore, aging at high temperature needs to be performed to repair the defective portions in the manufacturing process of electrolytic capacitors. During the aging, for self-repairing, a voltage needs to be applied across the positive and negative electrodes, which are external electrodes.

In this case, for an integrated capacitor in which a plurality of independent capacitor elements are integrated as described in Patent Document 1, a voltage needs to be applied across the electrodes of individual capacitor elements. When an integrated capacitor is built into the board of an electronic device, a larger number of capacitor elements need to be integrated. Specifically, in many cases, approximately 50 to 100 capacitor elements are integrated into one integrated capacitor. In this case, the integrated capacitor has one hundred to several hundreds of voltage application points.

The problem described above is not limited to the aging for electrolytic capacitors and also occurs similarly when a voltage is applied to various capacitors to check for the presence or absence of a short circuit. Accordingly, the problem is common to integrated capacitors regardless of the type.

The present invention addresses the problem described above with an object of providing an integrated capacitor in which a voltage can be easily applied across the electrodes of individual capacitor elements. In addition, another object of the present invention is to provide a method of manufacturing an integrated capacitor in which a voltage can be easily applied across the electrodes of individual capacitor elements.

According to the present invention, there is provided an integrated capacitor including: a plurality of capacitor elements each having one of first internal electrodes and one of second internal electrodes; an exterior body accommodating the plurality of capacitor elements; a plurality of first external electrode layers on an outer surface of the exterior body, the first external electrode layers being electrically connected to the first internal electrodes of the plurality of capacitor elements, respectively; and a plurality of second external electrode layers on the outer surface of the exterior body, the second external electrode layers being electrically connected to the second internal electrodes of the plurality of the capacitor elements, respectively. The first external electrode layer of at least a first capacitor element of the plurality of capacitor elements has a projecting portion projecting outward or a recessed portion recessed inward from part of an outer edge of the first external electrode layer in a plan view in a thickness direction of the first external electrode layer.

According to the present invention, there is provided a method of manufacturing an integrated capacitor, the method including: preparing an aggregation of a plurality of capacitor elements each having a first internal electrode and a second internal electrode; electrically coupling a plurality of first external electrode layers to each other through first wiring on an outer surface of an exterior body internally accommodating the plurality of capacitor elements, the first plurality of first external electrode layers being electrically connected to the first internal electrodes of the plurality of capacitor elements, respectively; electrically coupling a plurality of second external electrode layers to each other through second wiring on the outer surface of the exterior body, the plurality of second external electrode layers being electrically connected to the second internal electrodes of the plurality of the capacitor elements, respectively; applying a voltage across any one of the plurality of first external electrode layers and any one of the plurality of second external electrode layers;

electrically isolating the plurality of first external electrode layers from each other by cutting the first wiring after the application of the voltage; and electrically isolating the plurality of second external electrode layers from each other by cutting the second wiring after the application of the voltage.

According to the present invention, it is possible to provide an integrated capacitor in which a voltage can be easily applied across the electrodes of individual capacitor elements. Furthermore, according to the present invention, it is possible to provide a method of manufacturing an integrated capacitor in which a voltage can be easily applied across the electrodes of individual capacitor elements.

DETAILED DESCRIPTION OF THE PREFERRED EMBODIMENTS

Figure 1:
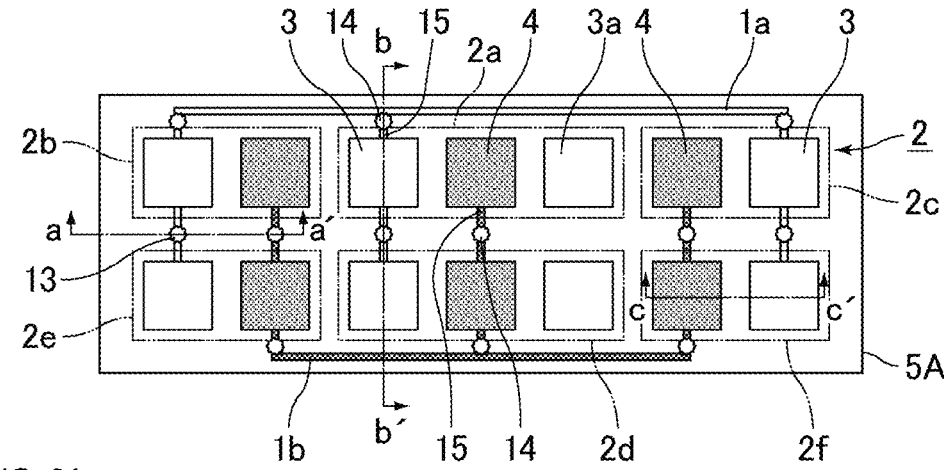
FIG. 1 is a plan view schematically illustrating an example of an integrated capacitor according to a first embodiment of the present invention.

An integrated capacitor and a method of manufacturing an integrated capacitor according to the present invention will be described below.

However, the present invention is not limited to the structures described below and can be modified and applied as appropriate within the spirit of the present invention. It should be noted that a combination of two or more individual desirable structures of the present invention described below is also within the scope of the present invention.

It will be appreciated that embodiments illustrated below are examples, and partial replacement or combination of structures illustrated in different embodiments can be performed. In the second and subsequent embodiments, matters the same as those of the first embodiment will not be described and only differences will be described. In particular, the same operations and effects obtained by the same structures are not described individually.

The drawings illustrated below are schematic, and the dimensions, the aspect ratios, and the like in the drawings may differ from those of an actual product.

First Embodiment

Figure 2A:
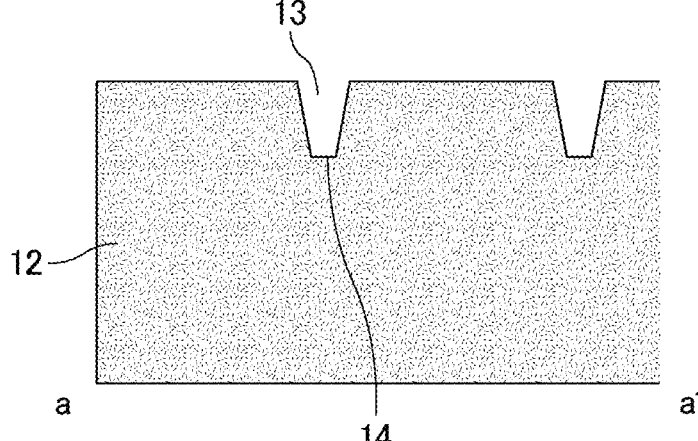
FIG. 2A is a sectional view of the integrated capacitor illustrated in FIG. 1, taken along line a-a'.
Figure 2B:
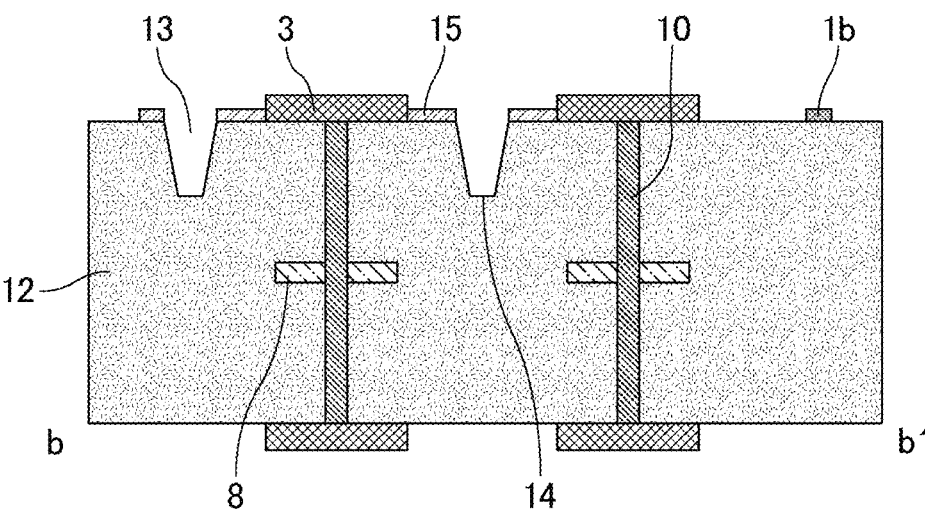
FIG. 2B is a sectional view of the integrated capacitor illustrated in FIG. 1, taken along line b-b'.
Figure 2C:
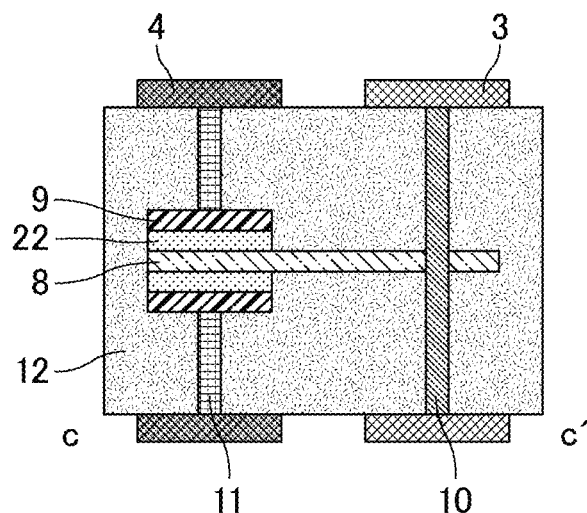
FIG. 2C is a sectional view of the integrated capacitor illustrated in FIG. 1, taken along line c-c'.

FIG. 1 is a plan view schematically illustrating an example of an integrated capacitor according to the first embodiment of the present invention. FIG. 2A is a sectional view of the integrated capacitor illustrated in FIG. 1, taken along line a-a'. FIG. 2B is a sectional view of the integrated capacitor illustrated in FIG. 1, taken along line b-b'. FIG. 2C is a sectional view of the integrated capacitor illustrated in FIG. 1, taken along line c-c'.

FIGS. 1, 2A, 2B, and 2C illustrate an integrated capacitor 5A that has a plurality of capacitor elements 2 in an exterior body 12 and has first external electrode layers 3 and second external electrode layers 4 of the capacitor elements 2 on the front and back surfaces of the exterior body 12.

FIG. 1 illustrates a first capacitor element 2a, a second capacitor element 2b, a third capacitor element 2c, a fourth capacitor element 2d, a fifth capacitor element 2e, and a sixth capacitor element 2f, but the number of the capacitor elements 2 is not particularly limited.

The first external electrode layers 3 are, for example, anode pads and the second external electrode layers 4 are, for example, cathode pads. The first external electrode layers 3 only need to be provided on the outer surface of the exterior body 12. For example, the first external electrode layers 3 may be provided on both the front and back surfaces of the exterior body 12 or may be provided on any one of the front and back surfaces. Similarly, the second external electrode layers 4 only need to be provided on the outer surface of the exterior body 12. For example, the second external electrode layers 4 may be provided on both the front and back surfaces of the exterior body 12 or may be provided on any one of the front and back surfaces.

In FIGS. 2B and 2C, the first external electrode layers 3 on the front and back surfaces are electrically connected to first internal electrodes 8 via connection through-holes 10, and the second external electrode layers 4 on the front and back surfaces are electrically connected to second internal electrodes 9 via connection via conductors 11. The first internal electrode 8 and the second internal electrode 9 do not need to have different polarities and may have, for example, no polarity.

Like the first capacitor element 2a and the fourth capacitor element 2d, third external electrode layers 3a electrically connected to the first internal electrode 8 of at least one of the capacitor elements 2 may be provided on the outer surface of the exterior body 12. The third external electrode layers 3a may be provided on, for example, both the front and back surfaces of the exterior body 12 or may be provided on any one of the front and back surfaces. The third external electrode layers 3a are, for example, anode pads. Like the first external electrode layers 3, the third external electrode layers 3a on the front and back surfaces are electrically connected to the first internal electrodes 8 via connection through-holes 10.

Although not illustrated, fourth external electrode layers electrically connected to the second internal electrodes 9 of at least one of the capacitor elements 2 may be provided on the outer surface of the exterior body 12. For example, the fourth external electrode layers may be provided on both the front and back surfaces of the exterior body 12 or may be provided on any one of the front and back surfaces. The fourth external electrode layers are, for example, cathode pads. Like the second external electrode layers 4, the fourth external electrode layers on the front and back surfaces are electrically connected to the second internal electrodes 9 through the connection via conductors 11.

The capacitor elements 2 are electrolytic capacitors, such as solid electrolytic capacitors. In this case, the first internal electrodes 8 are anodes and are made of, for example, aluminum. The second internal electrodes 9 are cathodes and are made of, for example, copper. The capacitor element 2 is formed by disposing a conductive polymer layer 22 between the first internal electrode 8 and the second internal electrode 9 and forming an oxidation layer (dielectric film), which is not illustrated, between the first internal electrode 8 and the conductive polymer layer 22.

It should be noted that the capacitor element 2 may be a ceramic capacitor including barium titanate or the like, or a thin film capacitor including silicon nitride (SiN), silicon dioxide ($SiO_2$), hydrogen fluoride (HF), or the like.

The exterior body 12 is made of, for example, a resin. In this case, the exterior body 12 is made of an insulating material made of a resin, such as epoxy, phenol, or polyimide, or a composite material, which is a mixture of a resin such as epoxy, phenol, or polyimide and an inorganic filler such as silica or alumina.

Figure 3:
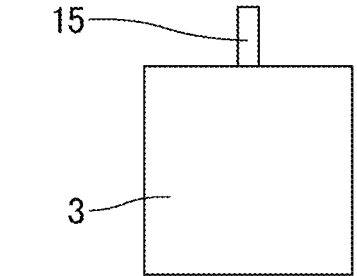
FIG. 3 is a plan view schematically illustrating an example of a first external electrode layer.

FIG. 3 is a plan view schematically illustrating an example of the first external electrode layer.

In the example illustrated in FIG. 3, the first external electrode layers 3 of the capacitor elements 2 each have a projecting portion 15 projecting outward from part of the outer edge of the first external electrode layer 3 in plan view in the thickness direction of the first external electrode layers 3.

Figure 4:
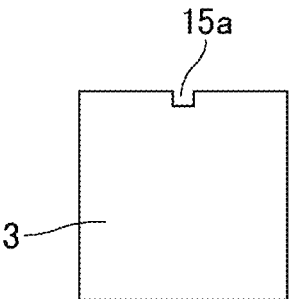
FIG. 4 is a plan view schematically illustrating another example of the first external electrode layer.

FIG. 4 is a plan view schematically illustrating another example of the first external electrode layers.

In the example illustrated in FIG. 4, the first external electrode layers 3 of the capacitor elements 2 each have a recessed portion 15a recessed inward from part of the outer edge of the first external electrode layer 3 in plan view in the thickness direction of the first external electrode layer 3.

In the integrated capacitor 5A illustrated in FIG. 1, the first external electrode layer 3 of the first capacitor element 2a has the projecting portion 15. In this case, as illustrated in FIGS. 2A and 2B, the outer surface of the exterior body

12 may have a depressed portion 14 on the extension line in the direction in which the projecting portion 15 of the first external electrode layer 3 projects. It should be noted that the first external electrode layer 3 of the first capacitor element 2a may have the recessed portion 15a instead of the projecting portion 15. In this case, the outer surface of the exterior body 12 may have the depressed portion 14 on the extension line in the direction opposite to the direction in which the recessed portion 15a of the first external electrode layer 3 is recessed.

In the integrated capacitor 5A illustrated in FIG. 1, the second external electrode layer 4 of the first capacitor element 2a has the projecting portion 15. In this case, in the outer surface of the exterior body 12, the depressed portion 14 may be present on the extension line in the direction in which the projecting portion 15 of the second external electrode layer 4 projects. It should be noted that the second external electrode layer 4 of the first capacitor element 2a may have the recessed portion 15a instead of the projecting portion 15. In this case, in the outer surface of the exterior body 12, the depressed portion 14 may be present on the extension line in the direction opposite to the direction in which the recessed portion 15a of the second external electrode layer 4 is recessed.

In the integrated capacitor 5A illustrated in FIG. 1, in the second capacitor element 2b, the third capacitor element 2c, the fourth capacitor element 2d, the fifth capacitor element 2e, and the sixth capacitor element 2f as well, the first external electrode layer 3 and the second external electrode layer 4 each have the projecting portion 15.

In the first embodiment of the present invention, the first external electrode layer of at least the first capacitor element of the plurality of capacitor elements has the projecting portion or the recessed portion. In the first embodiment of the present invention, as long as the first external electrode layer of the first capacitor element has the projecting portion or the recessed portion, the second external electrode layer of the first capacitor element may or may not have the projecting portion or the recessed portion. In addition, among the plurality of capacitor elements, there may be a capacitor element in which the first external electrode layer does not have the projecting portion or the recessed portion, and there may be a capacitor element in which the second external electrode layer does not have the projecting portion or the recessed portion.

In the first embodiment of the present invention, when the first external electrode layer has the projecting portion or the recessed portion, the outer surface of the exterior body may have the depressed portion on the extension line in the direction in which the projecting portion of the first external electrode layer projects or on the extension line in the direction opposite to the direction in which the recessed portion of the first external electrode layer is recessed. Similarly, when the second external electrode layer has the projecting portion or the recessed portion, the outer surface of the exterior body may have the depressed portion on the extension line in the direction in which the projecting portion of the second external electrode layer projects or on the extension line in the direction opposite to the direction in which the recessed portion of the second external electrode layer is recessed.

As described above, when a voltage needs to be applied across the electrodes of the integrated capacitor to perform aging or check for the presence or absence of a short circuit, in the method in which a voltage is applied across the electrodes of each of the capacitor elements, the more capacitor elements included in the integrated capacitor, the more the voltage application points.

As an example of the method of applying a voltage across the electrodes in such a case, there is proposed a method in which a voltage is applied with the integrated capacitor mounted in the socket. In this method, physical positioning is performed by using the outside shape of the integrated capacitor and the inner side of the socket, contact is made between the pins of the socket and the electrodes of the capacitor element, and a voltage is applied through the board on which the socket has been mounted. However, since it is necessary to prepare a socket having many pins that correspond to the outside shape and the electrode positions of the integrated capacitor, the manufacturing cost increases. In addition, since a socket is required for each product type that differs in the outer side of the integrated capacitor, the size of capacitor elements, and the disposition of capacitor elements, the manufacturing cost further increases.

Therefore, the inventors have considered the method of electrically coupling the plurality of first external electrode layers to each other through the first wiring and electrically coupling the plurality of second external electrode layers to each other through the second wiring in the aggregation of capacitor elements that constitutes the integrated capacitor. This method can apply a voltage across the electrodes of all capacitor elements included in the aggregation of capacitor elements by applying the voltage across any one of the first external electrode layers and any one of the second external electrode layers.

Figure 5:
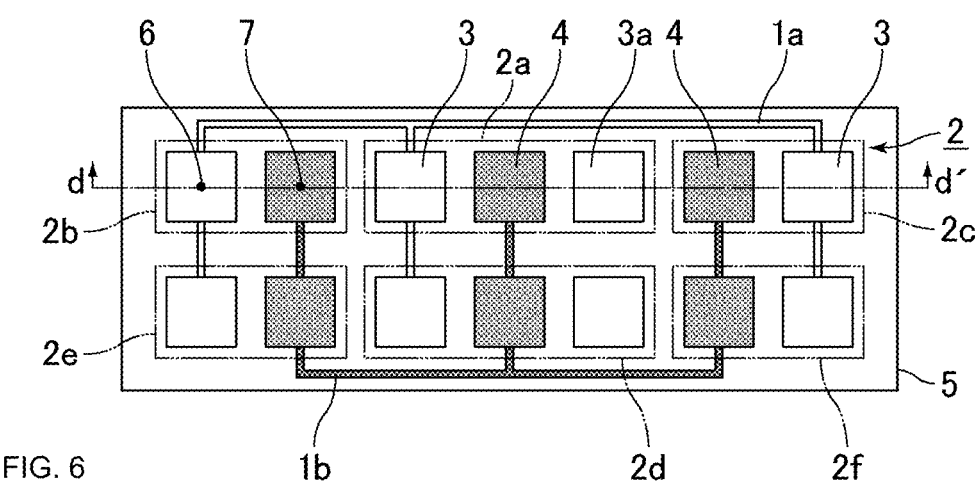
FIG. 5 is a plan view schematically illustrating an example of an aggregation of capacitor elements for manufacturing the integrated capacitor illustrated in FIG. 1.
Figure 6:
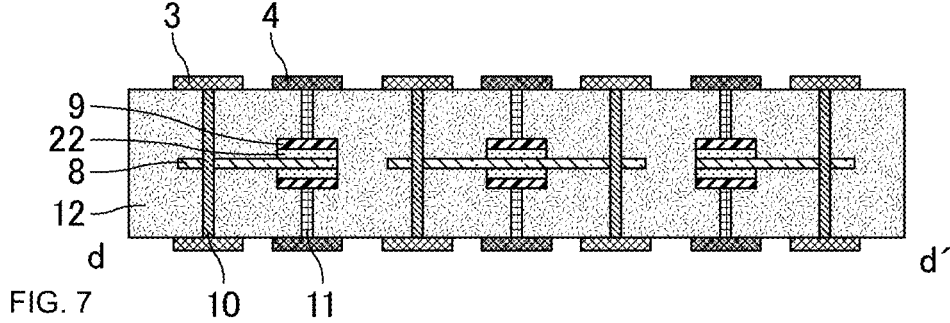
FIG. 6 is a sectional view of the aggregation of capacitor elements illustrated in FIG. 5, taken along line d-d'.

FIG. 5 is a plan view schematically illustrating an example of an aggregation of capacitor elements for manufacturing the integrated capacitor illustrated in FIG. 1. FIG. 6 is a sectional view of the aggregation of capacitor elements illustrated in FIG. 5, taken along line d-d'.

In the example illustrated in FIGS. 5 and 6, by electrically coupling the first external electrode layers 3 to each other through the first wiring 1a, electrically coupling the second external electrode layers 4 to each other through the second wiring 1b, and then applying a voltage across a voltage application point 6 of the first external electrode layer 3 and a voltage application point 7 of the second external electrode layer 4 of the second capacitor element 2b, the voltage can be applied across the electrodes of all capacitor elements 2 included in the aggregation 5 of the capacitor elements. It should be noted that the voltage application point 6 of the first external electrode layer 3 and the voltage application point 7 of the second external electrode layer 4 may be electrodes of a single capacitor element 2 or electrodes of different capacitor elements 2. Alternatively, the third external electrode layer may be used as the voltage application point 6 of the first external electrode layer 3, and the fourth external electrode layer may be used as the voltage application point 7 of the second external electrode layer 4.

After the voltage is applied, it is possible to easily return to the state in which individual capacitor elements 2 are made independent by cutting the first wiring 1a and the second wiring 1b with laser light or the like. The method of manufacturing an integrated capacitor as described above is also one example of the present invention.

FIG. 1 illustrates the integrated capacitor 5A in which the first wiring 1a and the second wiring 1b have been cut. That is, the first external electrode layer 3 and the second external electrode layer 4 each have the projecting portion 15 (see FIG. 3) as the remainder of the first wiring 1a or the second wiring 1b or each have the recessed portion 15a (see FIG. 4) as the trace of the first wiring 1a or the second wiring 1b. In addition, the outer surface of the exterior body 12 may have the depressed portion 14 due to fusion or removal.

According to the present invention, even if a voltage is applied by using a socket, the manufacturing cost can be significantly reduced because the socket requires only two pins. In addition, unlike the conventional method that requires many pins, highly accurate positioning is not necessary. Furthermore, a voltage can be applied by a more inexpensive method without using an expensive socket. For example, a simple contact tool having two pins can be used to apply a voltage. On the other hand, although the first wiring and the second wiring need to be formed in the present invention, the first wiring and the second wiring can be formed at the same time in the manufacturing process of an integrated capacitor as the end product, so the manufacturing cost does not increase compared with the case in which a socket is prepared for each product type.

In the method of manufacturing an integrated capacitor according to the present invention, the first wiring and the second wiring are preferably cut by a laser. For example, when the first wiring and the second wiring are made of a copper-based material, a UV-light laser or a green-light laser can be used to easily cut the first wiring and the second wiring.

Second Embodiment

In a second embodiment of the present invention, the first external electrode layers are electrically coupled to each other by using the first internal electrodes of the capacitor elements.

Figure 7:
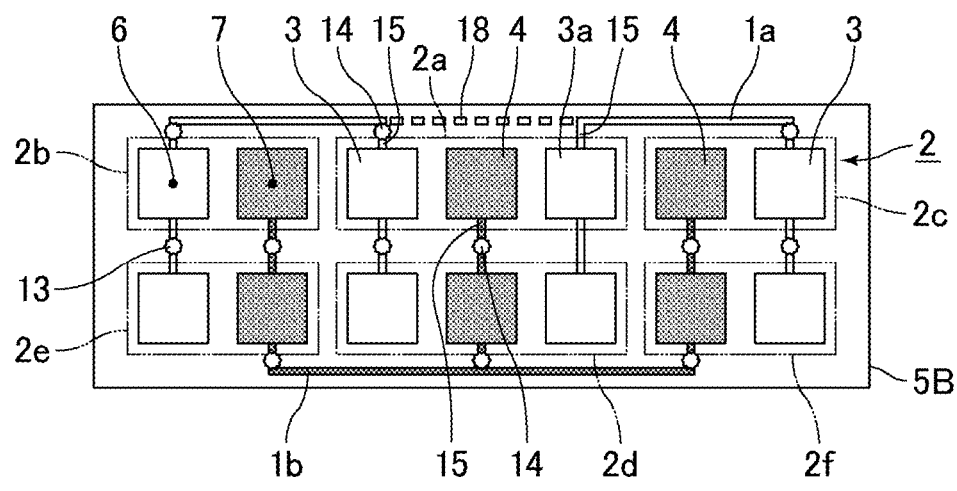
FIG. 7 is a plan view schematically illustrating an example of an integrated capacitor according to a second embodiment of the present invention.
Figure 8:
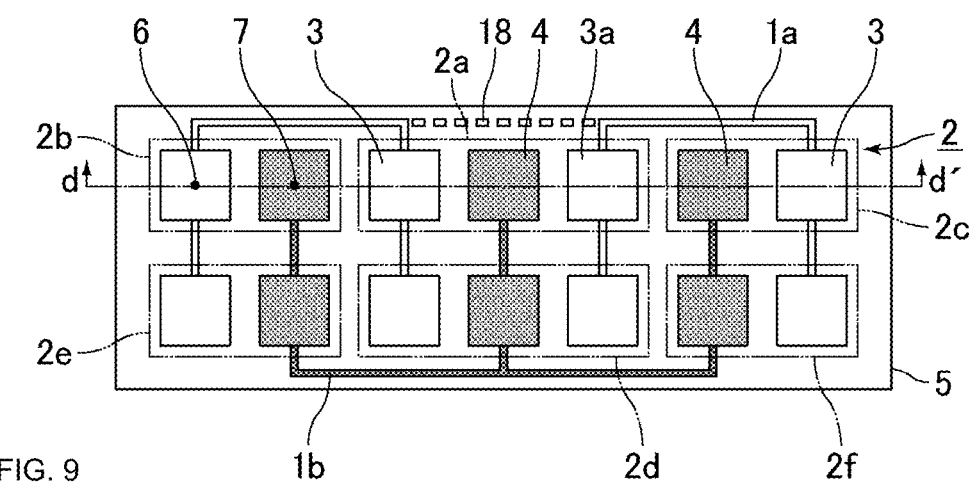
FIG. 8 is a plan view schematically illustrating an example of an aggregation of capacitor elements for manufacturing the integrated capacitor illustrated in FIG. 7.
Figure 9:
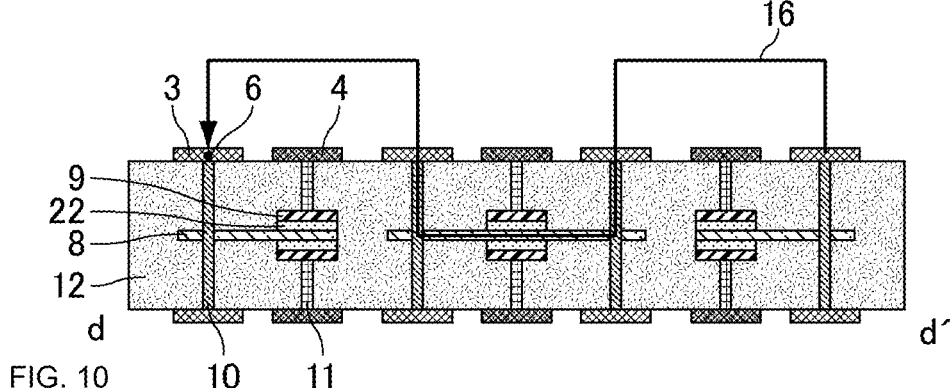
FIG. 9 is a sectional view of the aggregation of capacitor elements illustrated in FIG. 8, taken along line d-d'.

FIG. 7 is a plan view schematically illustrating an example of an integrated capacitor according to a second embodiment of the present invention. FIG. 8 is a plan view schematically illustrating an example of an aggregation of capacitor elements for manufacturing the integrated capacitor illustrated in FIG. 7. FIG. 9 is a sectional view of the aggregation of capacitor elements illustrated in FIG. 8, taken along line d-d'.

In the example illustrated in FIGS. 8 and 9, the first external electrode layer 3 and the third external electrode layer 3a of the first capacitor element 2a are connected to each other through the first internal electrode 8 and not through the first wiring 1a, and the third external electrode layer 3a of the first capacitor element 2a and the first external electrode layer 3 of the third capacitor element 2c are electrically connected to each other through the first wiring 1a. Accordingly, the first external electrode layers 3 are electrically coupled to each other through the connection path 16 illustrated in FIG. 9.

As described above, in the second embodiment of the present invention, the third external electrode layer electrically connected to the first internal electrode of at least one capacitor element of the plurality of capacitor elements is provided on the outer surface of the exterior body, the first external electrode layer and the third external electrode layer of a single capacitor element are electrically connected to each other through the first internal electrode and not through the first wiring, and the third external electrode layer of the single capacitor element and the first external electrode layer of another capacitor element are electrically connected to each other through the first wiring, thereby electrically coupling the plurality of first external electrode layers to each other.

In the second embodiment of the present invention, the second external electrode layers may be electrically coupled to each other by using the second internal electrode of the capacitor element. That is, the fourth external electrode layer electrically connected to the second internal electrode of at least one capacitor element of the plurality of capacitor elements is provided on the outer surface of the exterior body, the second external electrode layer and the fourth external electrode layer of a single capacitor element are electrically connected to each other through the second internal electrode and not through the second wiring, and the fourth external electrode layer of the single capacitor element and the second external electrode layer of another capacitor element are electrically connected to each other through the second wiring, thereby electrically coupling the plurality of second external electrode layers to each other.

In the example illustrated in FIGS. 8 and 9, a voltage can be applied across the electrodes of all capacitor elements 2 included in the aggregation 5 of the capacitor elements by applying the voltage across the voltage application point 6 of the first external electrode layer 3 and the voltage application point 7 of the second external electrode layer 4 of the second capacitor element 2b. It should be noted that the voltage application point 6 of the first external electrode layer 3 and the voltage application point 7 of the second external electrode layer 4 may be the electrodes of a single capacitor element 2 or may be the electrodes of different capacitor elements 2. Alternatively, the third external electrode layer may be used as the voltage application point 6 of the first external electrode layer 3, and the fourth external electrode layer may be used as the voltage application point 7 of the second external electrode layer 4.

After the voltage is applied, it is possible to easily return to the state in which individual capacitor elements 2 are made independent by cutting the first wiring 1a and the second wiring 1b.

FIG. 7 illustrates the integrated capacitor 5B in which the first wiring 1a and the second wiring 1b have been cut. Since the first wiring 1a was connected to the third external electrode layer 3a, the third external electrode layer 3a has the projecting portion 15 projecting outward from part of the outer edge of the third external electrode layer 3a in plan view in the thickness direction of the third external electrode layer 3a. Alternatively, the third external electrode layer 3a may have the recessed portion 15a recessed inward from part of the outer edge of the third external electrode layer 3a in plan view in the thickness direction of the third external electrode layer 3a. In this case, the outer surface of the exterior body 12 may have the depressed portion 14 on the extension line in the direction in which the projecting portion 15 of the third external electrode layer 3a projects or on the extension line in the direction opposite to the direction in which the recessed portion 15a of the third external electrode layer 3a is recessed.

According to the second embodiment of the present invention, the same effect as in the first embodiment can be obtained. Furthermore, since the first wiring or the second wiring can be reduced in the second embodiment, the region for the wiring becomes smaller. As a result, the degree of freedom to design external electrode layers can be improved and the size of the integrated capacitor can also be reduced. For example, in the example illustrated in FIGS. 8 and 9, since the first wiring 1a does not need to be formed in the unnecessary position 18 of the first wiring indicated by the dashed line, the region for the first wiring 1a on the outer surface of the exterior body 12 can be smaller than in FIG. 1.

Third Embodiment

In a third embodiment of the present invention, the first external electrode layers are electrically coupled to each other by disposing a dummy electrode layer having the same pole as the first external electrode layer of an adjacent capacitor element and using the first internal electrode in the same method as in the second embodiment.

Figure 10:
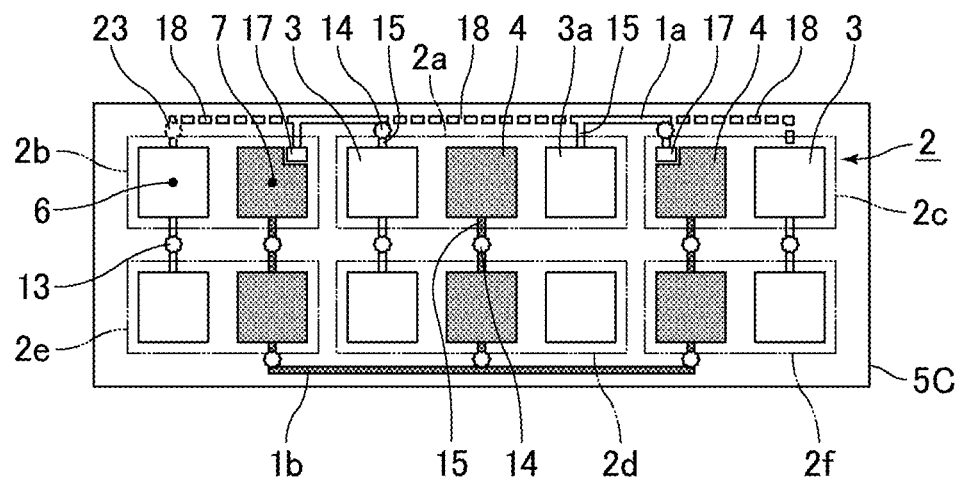
FIG. 10 is a plan view schematically illustrating an example of an integrated capacitor according to a third embodiment of the present invention.
Figure 11:
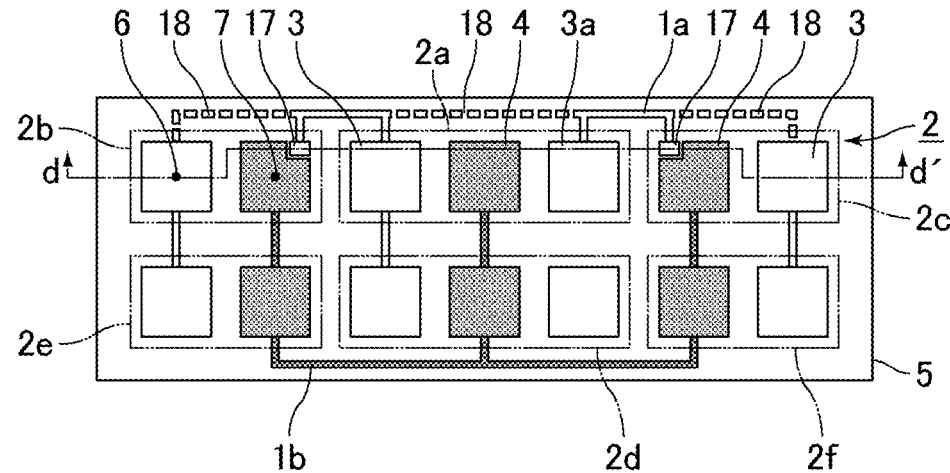
FIG. 11 is a plan view schematically illustrating an example of an aggregation of capacitor elements for manufacturing the integrated capacitor illustrated in FIG. 10.
Figure 12:
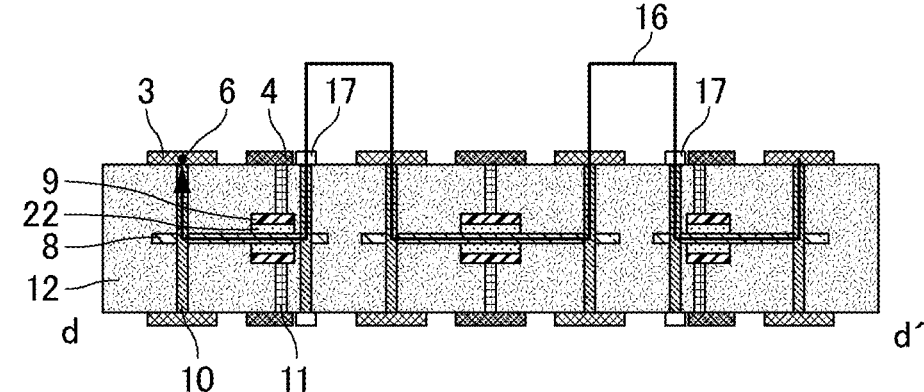
FIG. 12 is a sectional view of the aggregation of capacitor elements illustrated in FIG. 11, taken along line d-d'.

FIG. 10 is a plan view schematically illustrating an example of an integrated capacitor according to the third embodiment of the present invention. FIG. 11 is a plan view schematically illustrating an example of an aggregation of capacitor elements for manufacturing the integrated capacitor illustrated in FIG. 10. FIG. 12 is a sectional view of the aggregation of capacitor elements illustrated in FIG. 11, taken along line d-d'.

In the example illustrated in FIGS. 11 and 12, dummy electrode layers 17 electrically connected to the first internal electrode 8 of the second capacitor element 2b or the third capacitor element 2c are provided on the front and back surfaces of the exterior body 12. The dummy electrode layers 17 only need to be provided on the outer surface of the exterior body 12. For example, the dummy electrode layers 17 may be provided on both the front and back surfaces of the exterior body 12 or may be provided on any one of the front and back surfaces. Like the first external electrode layer 3, the dummy electrode layer 17 on the front and back surfaces are electrically connected to the internal first internal electrodes 8 through the connection through-holes 10.

The dummy electrode layer 17 of the second capacitor element 2b is adjacent to the first external electrode layer 3 of the first capacitor element 2a, which is adjacent to the second capacitor element 2b. The first external electrode layer 3 and the dummy electrode layer 17 of the second capacitor element 2b are electrically connected to each other through the first internal electrode 8 and not through the first wiring 1a, and the dummy electrode layer 17 of the second capacitor element 2b and the first external electrode layer 3 of the first capacitor element 2a are electrically connected to each other through the first wiring 1a.

The dummy electrode layer 17 of the third capacitor element 2c is adjacent to the third external electrode layer 3a of the first capacitor element 2a, which is adjacent to the third capacitor element 2c. The first external electrode layer 3 and the dummy electrode layer 17 of the third capacitor element 2c are electrically connected to each other through the first internal electrode 8 and not through the first wiring 1a, and the dummy electrode layer 17 of the third capacitor element 2c and the third external electrode layer 3a of the first capacitor element 2a are electrically connected to each other through the first wiring 1a.

The first external electrode layer 3 and the third external electrode layer 3a of the first capacitor element 2a are electrically connected to each other through the first internal electrode 8 and not through the first wiring 1a.

Accordingly, the first external electrode layers 3 are electrically connected to each other through the connection path 16 illustrated in FIG. 12.

As described above, in the third embodiment of the present invention, the dummy electrode layer electrically connected to the first internal electrode of at least one capacitor element of the plurality of capacitor elements is provided on the outer surface of the exterior body, the dummy electrode layer is adjacent to the first external electrode layer of the capacitor element adjacent to the at least one capacitor element, the first external electrode layer and the dummy electrode layer of a single capacitor element are electrically connected to each other through the first internal electrode and not through the first wiring, and the dummy electrode layer of the single capacitor element and the first external electrode layer of the adjacent capacitor element are electrically connected to each other through the first wiring, thereby electrically coupling the plurality of first external electrode layers to each other.

In the third embodiment of the present invention, the second external electrode layers may be electrically coupled to each other by using the second internal electrode of the capacitor element. That is, the dummy electrode layer electrically connected to the second internal electrode of at least one capacitor element of the plurality of capacitor elements is provided on the outer surface of the exterior body, the dummy electrode layer is adjacent to the second external electrode layer of the capacitor element adjacent to the at least one capacitor element, the second external electrode layer and the dummy electrode layer of a single capacitor element are electrically connected to each other through the second internal electrode and not through the second wiring, and the dummy electrode layer of the single capacitor element and the second external electrode layer of the adjacent capacitor element are electrically connected to each other through the second wiring, thereby allowing the plurality of second external electrode layers to be electrically coupled to each other.

In the example illustrated in FIGS. 11 and 12, a voltage can be applied across the electrodes of all capacitor elements 2 included in the aggregation 5 of the capacitor elements by applying the voltage across the voltage application point 6 of the first external electrode layer 3 and the voltage application point 7 of the second external electrode layer 4 of the second capacitor element 2b. It should be noted that the voltage application point 6 of the first external electrode layer 3 and the voltage application point 7 of the second external electrode layer 4 may be the electrodes of a single capacitor element 2 or the electrodes of different capacitor elements 2. Alternatively, the third external electrode layer may be used as the voltage application point 6 of the first external electrode layer 3, and the fourth external electrode layer may be used as the voltage application point 7 of the second external electrode layer 4.

After the voltage is applied, it is possible to easily return to the state in which individual capacitor elements 2 are made independent by cutting the first wiring 1a and the second wiring 1b.

FIG. 10 illustrates the integrated capacitor 5C in which the first wiring 1a and the second wiring 1b have been cut. Since the first wiring 1a was connected to the dummy electrode layer 17, the dummy electrode layer 17 has the projecting portion 15 projecting outward from part of the outer edge of the dummy electrode layer 17 in plan view in the thickness direction of the dummy electrode layer 17. Alternatively, the dummy electrode layer 17 may have a recessed portion that is recessed inward from part of the outer edge of the dummy electrode layer 17 in plan view in the thickness direction of the dummy electrode layer 17.

According to the third embodiment of the present invention, the same effect as in the second embodiment can be obtained. Since the first wiring or the second wiring can be further reduced compared with the second embodiment, the region for wiring is further reduced. As a result, the degree of freedom to design the external electrode layers can be further improved, and the size of the integrated capacitor can also be further reduced. In addition, since the number of the wiring cut positions 13 by laser fusion cutting or the like can be reduced, the manufacturing cost can also be reduced. For example, since the first external electrode layers 3 do not need to be cut in a wiring cut unnecessary position 23 indicated by the dashed line in the example illustrated in FIGS. 11 and 12, the number of positions in which the first external electrode layers 3 need to be cut is five, which is smaller than six in the example illustrated in FIGS. 8 and 9.

Fourth Embodiment

In a fourth embodiment of the present invention, a material layer having a low laser absorbance is disposed under the first wiring in at least the wiring cut position by laser fusion cutting.

Figure 13:
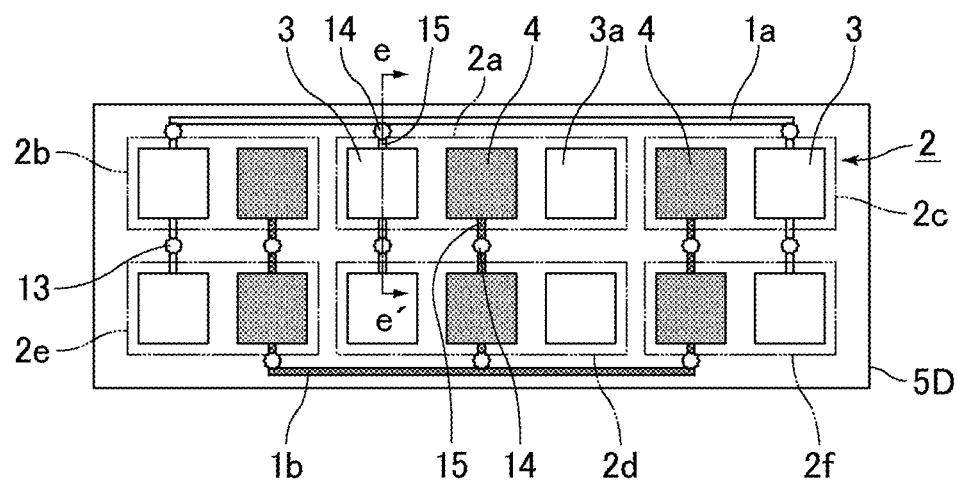
FIG. 13 a plan view schematically illustrating an example of an integrated capacitor according to a fourth embodiment of the present invention.
Figure 14:
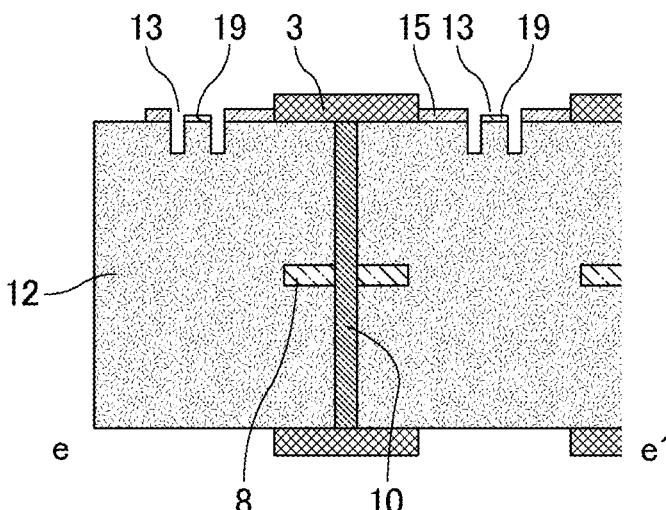
FIG. 14 is an example of a sectional view of the integrated capacitor illustrated in FIG. 13, taken along line e-e'.
Figure 15:
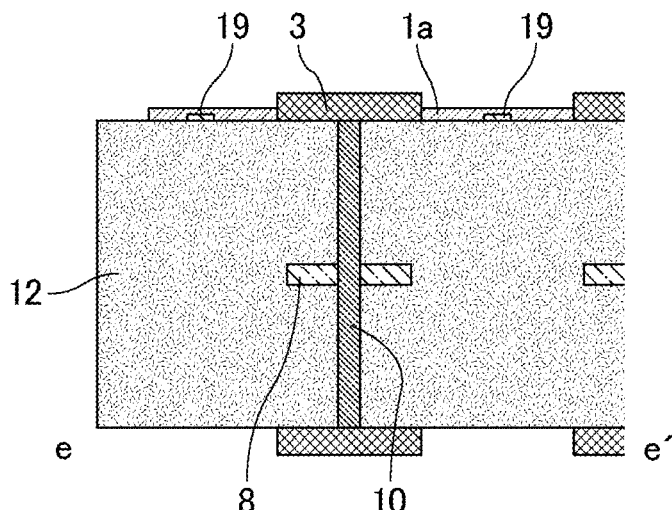
FIG. 15 is a sectional view of the integrated capacitor illustrated in FIG. 14 in which first wiring is not yet cut.

FIG. 13 a plan view schematically illustrating an example of an integrated capacitor according to the fourth embodiment of the present invention. FIG. 14 is an example of a sectional view of the integrated capacitor illustrated in FIG. 13, taken along line e-e'. FIG. 15 is a sectional view of the integrated capacitor illustrated in FIG. 14 in which the first wiring is not yet cut.

In the example illustrated in FIG. 15, a material layer 19 having a lower laser absorbance than the first wiring 1a is provided between the first wiring 1a and the outer surface of the exterior body 12. Although the material layer 19 having a lower laser absorbance may be provided between the entire first wiring 1a and the outer surface of the exterior body 12, the material layer 19 only needs to be provided between the first wiring 1a in at least the wiring cut position 13 (see FIG. 14) by laser fusion cutting and the outer surface of the exterior body 12. The material layer 19 having a lower laser absorbance is made of an aluminum-based material when, for example, a UV-light laser or a green-light laser is used.

FIG. 13 illustrates the integrated capacitor 5D in which the first wiring 1a and the second wiring 1b have been cut. After the first wiring 1a has been cut, as illustrated in FIG. 14, the material layer 19 having a lower laser absorbance than the projecting portion 15 of the first external electrode layer 3 is provided on the extension line in the direction in which the projecting portion 15 projects, on the outer surface of the exterior body 12.

As described above, in the fourth embodiment of the present invention, in the state in which the first wiring is not yet cut, the material layer having a lower laser absorbance than the first wiring is provided between at least part of the first wiring and the outer surface of the exterior body. On the other hand, in the integrated capacitor in which the first wiring has been cut, the material layer having a lower laser absorbance than the projecting portion of the first external electrode layer is provided on the extension line in the direction in which the projecting portion projects, on the outer surface of the exterior body. It should be noted that, in the integrated capacitor in which the first wiring has been cut, the material layer having a lower laser absorbance may be provided on the extension line in the direction opposite to the direction in which the recessed portion of the first external electrode layer is recessed, on the outer surface of the exterior body.

In the fourth embodiment of the present invention, the material layer having a lower laser absorbance may be disposed under the second wiring in at least the wiring cut position by laser fusion cutting. That is, in the state in which the second wiring is not yet cut, the material layer having a lower laser absorbance than the second wiring may be provided between at least part of the second wiring and the outer surface of the exterior body. On the other hand, in the integrated capacitor in which the second wiring has been cut, the material layer having a lower laser absorbance than the projecting portion may be provided on the extension line in the direction in which the projecting portion projects of the second external electrode layer on the outer surface of the exterior body. It should be noted that, in the integrated capacitor in which the second wiring has been cut, the material layer having a lower laser absorbance may be provided on the extension line in the direction opposite to the direction in which the recessed portion of the second external electrode layer is recessed, on the outer surface of the exterior body.

The fusing (sublimation) rate changes depending on the difference in the absorbance of the material irradiated with laser light. For example, when the first wiring 1a and the second wiring 1b are made of a copper-based material and the exterior body 12 includes a resin, the first wiring 1a and the second wiring 1b have a lower laser absorbance than the exterior body 12. Accordingly, when the material layer 19 having a lower laser absorbance is not disposed, the exterior body 12 is pierced by laser light and easily damaged immediately after the first wiring 1a and the second wiring 1b are fusion-cut. Adjustment of the output power and the irradiation time of laser light can reduce the damage to the exterior body 12 to some extent, but the elimination of the damage to the exterior body 12 is difficult because there are variations in the thickness of the first wiring 1a and the second wiring 1b. On the other hand, from the viewpoint of product usage and reliability, the damage to the exterior body 12 due to laser light is preferably suppressed as small as possible.

Therefore, the material layer 19 having a lower laser absorbance is disposed under the first wiring 1a or the second wiring 1b in at least the wiring cut position 13 by laser fusion cutting to reflect laser light as illustrated in FIG. 15, thereby enabling reduction in the damage to the exterior body 12. For example, when the material layer 19 having a lower laser absorbance is made of an aluminum-based material, this material layer 19 reflects approximately 80% of the laser light. For example, in the case of UV laser light, the laser absorbance of copper is approximately 80% and the laser absorbance of aluminum is approximately 20%. Therefore, the material layer 19 having a low laser absorbance may melt or the exterior body 12 may partially melt due to the variation tolerance of the irradiation position of laser light, but the damage to the exterior body 12 is greatly reduced.

Fifth Embodiment

In a fifth embodiment of the present invention, the first internal electrode or the second internal electrode is disposed under the first wiring in at least the wiring cut position by laser fusion cutting.

Figure 16:
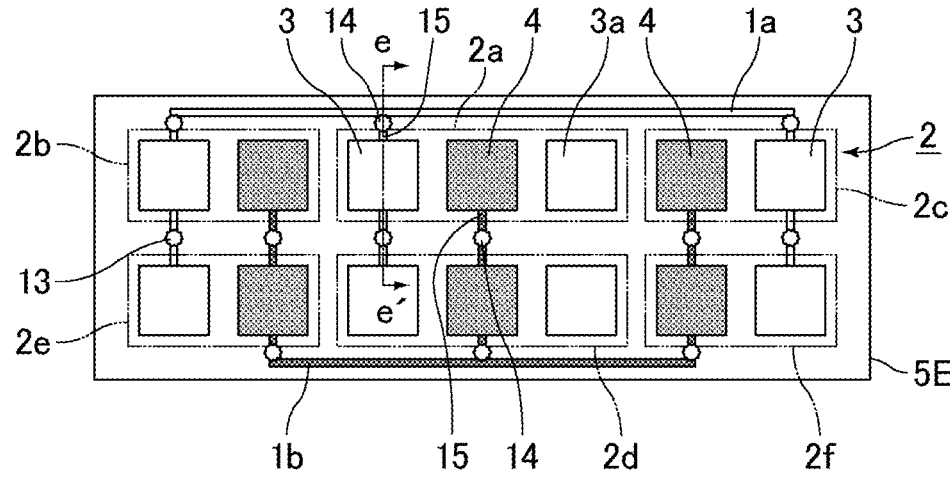
FIG. 16 is a plan view schematically illustrating an example of an integrated capacitor according to a fifth embodiment of the present invention.
Figure 17:
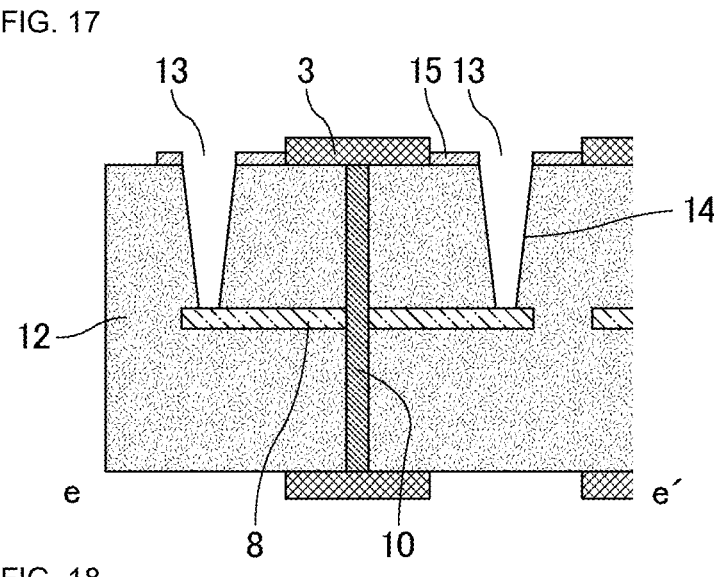
FIG. 17 is an example of a sectional view of the integrated capacitor illustrated in FIG. 16, taken along line e-e'.
Figure 18:
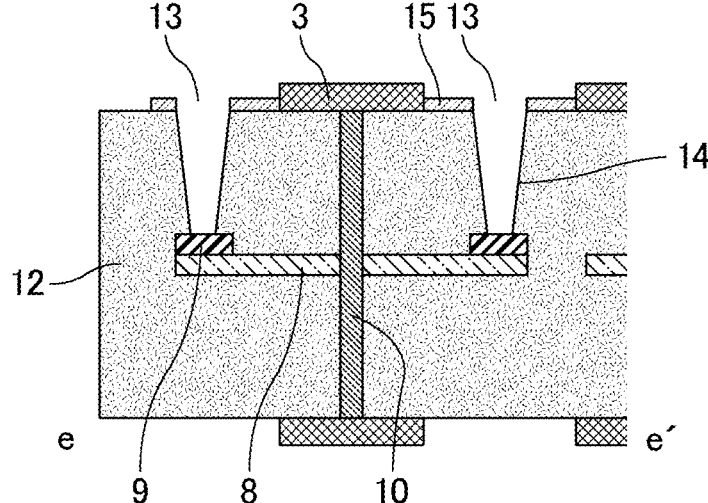
FIG. 18 is another example of a sectional view of the integrated capacitor illustrated in FIG. 16, taken along line e-e'.
Figure 19:
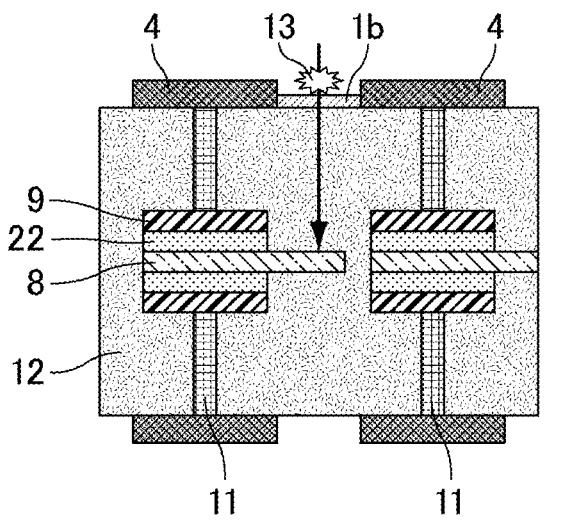
FIG. 19 is a sectional view schematically illustrating an example of a method of manufacturing the integrated capacitor illustrated in FIG. 17.
Figure 20:
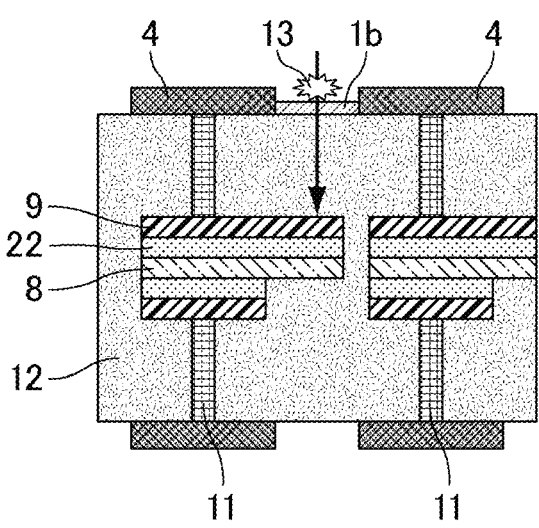
FIG. 20 is a sectional view schematically illustrating an example of a method of manufacturing the integrated capacitor illustrated in FIG. 18.

FIG. 16 is a plan view schematically illustrating an example of an integrated capacitor according to the fifth embodiment of the present invention. FIG. 17 is an example of a sectional view of the integrated capacitor illustrated in FIG. 16, taken along line e-e'. FIG. 18 is another example of a sectional view of the integrated capacitor illustrated in FIG. 16, taken along line e-e'. FIG. 19 is a sectional view schematically illustrating an example of a method of manufacturing the integrated capacitor illustrated in FIG. 17. FIG. 20 is a sectional view schematically illustrating an example of a method of manufacturing the integrated capacitor illustrated in FIG. 18.

For example, the first internal electrode 8 is disposed to overlap part of the first wiring 1a in plan view in the thickness direction of the first external electrode layer 3. The first internal electrode 8 only needs to be disposed to overlap the first wiring 1a in at least the wiring cut position 13 by laser fusion cutting. As illustrated in FIG. 19, the first internal electrode 8 may be disposed to overlap part of the second wiring 1b in plan view in the thickness direction of the second external electrode layer 4. The first internal electrode 8 only needs to be disposed to overlap the second wiring 1b in at laser the wiring cut position 13 by laser fusion cutting.

In addition, the second internal electrode 9 may be disposed to overlap part of the first wiring 1a in plan view in the thickness direction of the first external electrode layer 3. The second internal electrode 9 only needs to be disposed to overlap the first wiring 1a in at least the wiring cut position 13 by laser fusion cutting. As illustrated in FIG. 20, the second internal electrode 9 may be disposed to overlap part of the second wiring 1b in plan view in the thickness direction of the second external electrode layer 4. The second internal electrode 9 only needs be disposed to overlap the second wiring 1b in at least the wiring cut position 13 by laser fusion cutting.

FIG. 16 illustrates the integrated capacitor 5E in which the first wiring 1a and the second wiring 1b have been cut. After the first wiring 1a has been cut, the first internal electrode 8 is disposed to overlap the depressed portion 14 in plan view in the thickness direction of the first external electrode layer 3 as illustrated in FIG. 17 or the second internal electrode 9 is disposed to overlap the depressed portion 14 in plan view in the thickness direction of the first external electrode layer 3 as illustrated in FIG. 18. It should be noted that a conductive polymer layer 22 is not illustrated in FIG. 18. The depressed portion 14 may or does not need to reach the first internal electrode 8 or the second internal electrode 9.

As described above, in the fifth embodiment of the present invention, in the state in which the first wiring is not yet cut, the first internal electrode or the second internal electrode of at least one capacitor element of the plurality of capacitor elements is disposed to overlap part of the first wiring in plan view in the thickness direction of the first external electrode layer of the at least one capacitor element. On the other hand, in the integrated capacitor in which the first wiring has been cut, the outer surface of the exterior body has the depressed portion on the extension line in the direction in which the projecting portion of the first external electrode layer projects or on the extension line in the direction opposite to the direction in which the recessed portion of the first external electrode layer is recessed, and the first internal electrode or the second internal electrode of the first capacitor element is disposed to overlap the depressed portion in plan view in the thickness direction of the first external electrode layer of the first capacitor element.

In the fifth embodiment of the present invention, the first internal electrode or the second internal electrode may be disposed under the second wiring in at least the wiring cut position by laser fusion cutting. That is, in the state in which the second wiring is not yet cut, the first internal electrode or the second internal electrode of at least one capacitor element of the plurality of capacitor elements may be disposed to overlap part of the second wiring in plan view in the thickness direction of the second external electrode layer of the at least one capacitor element. On the other hand, in the integrated capacitor in which the second wiring has been cut, the outer surface of the exterior body has the depressed portion on the extension line in the direction in which the projecting portion of the second external electrode layer projects or on the extension line in the direction opposite to the direction in which the recessed portion of the second external electrode layer is recessed, and the first internal electrode or the second internal electrode of the first capacitor element may be disposed to overlap the depressed portion in plan view in the thickness direction of the second external electrode layer of the first capacitor element.

As illustrated in FIGS. 19 and 20, the damage to the exterior body 12 due to laser light can be stopped at the first internal electrode 8 or the second internal electrode 9 at a maximum by disposing the first internal electrode 8 or the second internal electrode 9 under the first wiring 1a or the second wiring 1b in at least the wiring cut position 13 by laser fusion cutting.

For example, when the first internal electrode 8 is made of aluminum and the second internal electrode 9 is made of copper, the laser absorbance of copper is higher than the laser absorbance of aluminum but is lower than the laser absorbance of the resin constituting the exterior body 12 and the difference is large, so that the damage to the exterior body 12 due to laser light can be stopped at the second internal electrode 9.

Furthermore, since the structure of the fifth embodiment of the present invention can be formed at the same time with the manufacturing of the integrated capacitor, the manufacturing cost can be lower than that in the fourth embodiment.

Sixth Embodiment

In a sixth embodiment of the present invention, the exterior body is made of a material having a laser transmittance of 90% or higher.

Figure 21:
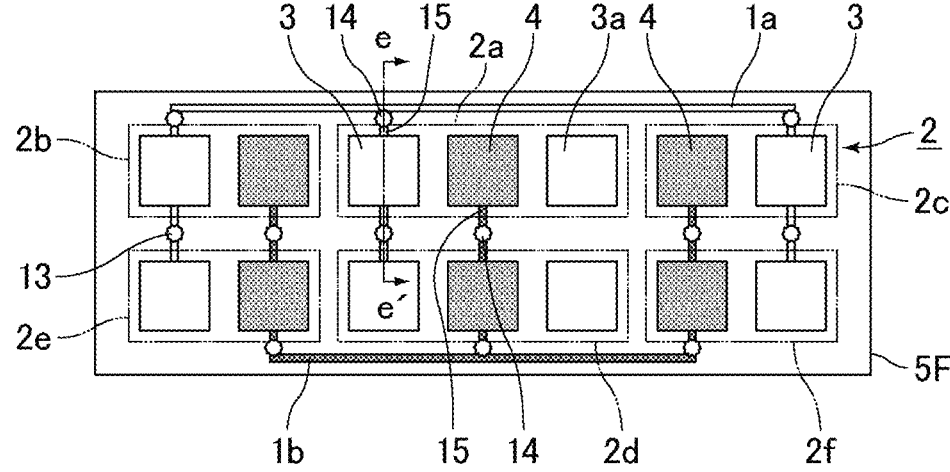
FIG. 21 is a plan view schematically illustrating an example of an integrated capacitor according to a sixth embodiment of the present invention.
Figure 22:
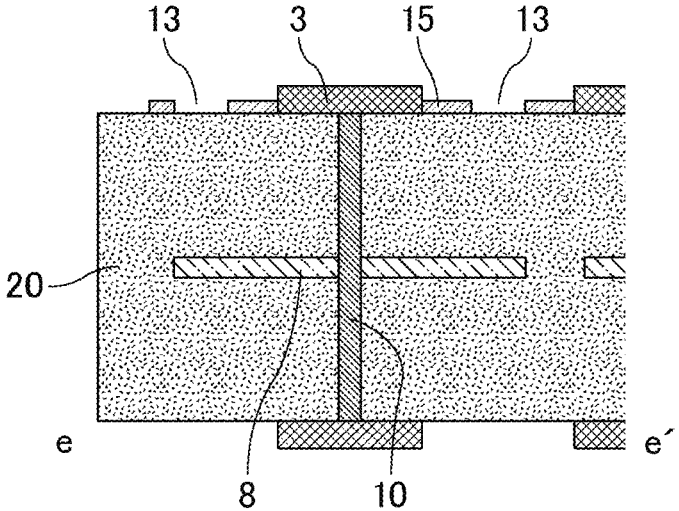
FIG. 22 is an example of a sectional view of the integrated capacitor illustrated in FIG. 21, taken along line e-e'.
Figure 23:
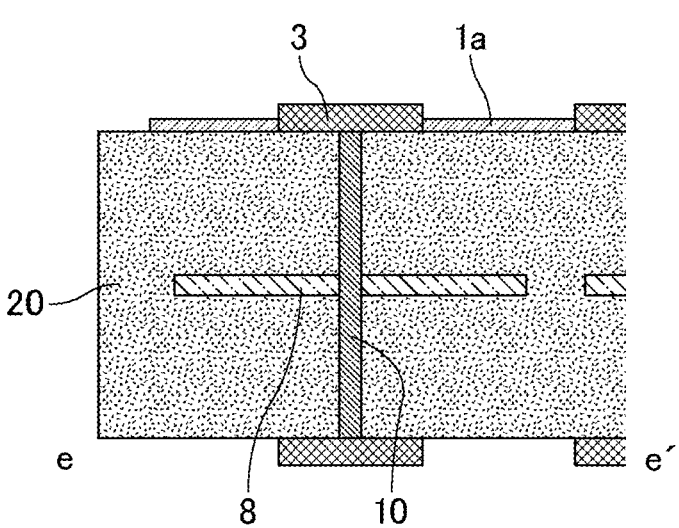
FIG. 23 is a sectional view of the integrated capacitor illustrated in FIG. 22 in which the first wiring is not yet cut.

FIG. 21 is a plan view schematically illustrating an example of an integrated capacitor according to the sixth embodiment of the present invention. FIG. 22 is an example of a sectional view of the integrated capacitor illustrated in FIG. 21, taken along line e-e'. FIG. 23 is a sectional view of the integrated capacitor illustrated in FIG. 22 in which the first wiring is not yet cut.

In the example illustrated in FIG. 23, the exterior body 20 is made of a material having a laser transmittance of 90% or higher. For example, the exterior body 20 is made of a methacrylic resin (MMA) or a glass fiber reinforced acrylic resin (FRA) when a UV-light laser is used, or the exterior body 20 is made of glass when a green-light laser is used.

FIG. 21 illustrates the integrated capacitor 5F in which the first wiring 1a and the second wiring 1b have been cut.

When the exterior body 20 is made of a material having a high laser transmittance, such as a glass material, as illustrated in FIG. 23, laser light can easily pass through the exterior body 20 after the first wiring 1a or the second wiring 1b is fusion-cut. Therefore, as illustrated in FIG. 22, the exterior body 20 is unlikely to be damaged and the first wiring 1a or the second wiring 1b required to be fusion-cut can be fusion-cut.

Seventh Embodiment

In a seventh embodiment of the present invention, a plurality of aggregations of capacitor elements are disposed and an aggregation of integrated capacitors accommodated in the exterior body is prepared.

Figure 24:
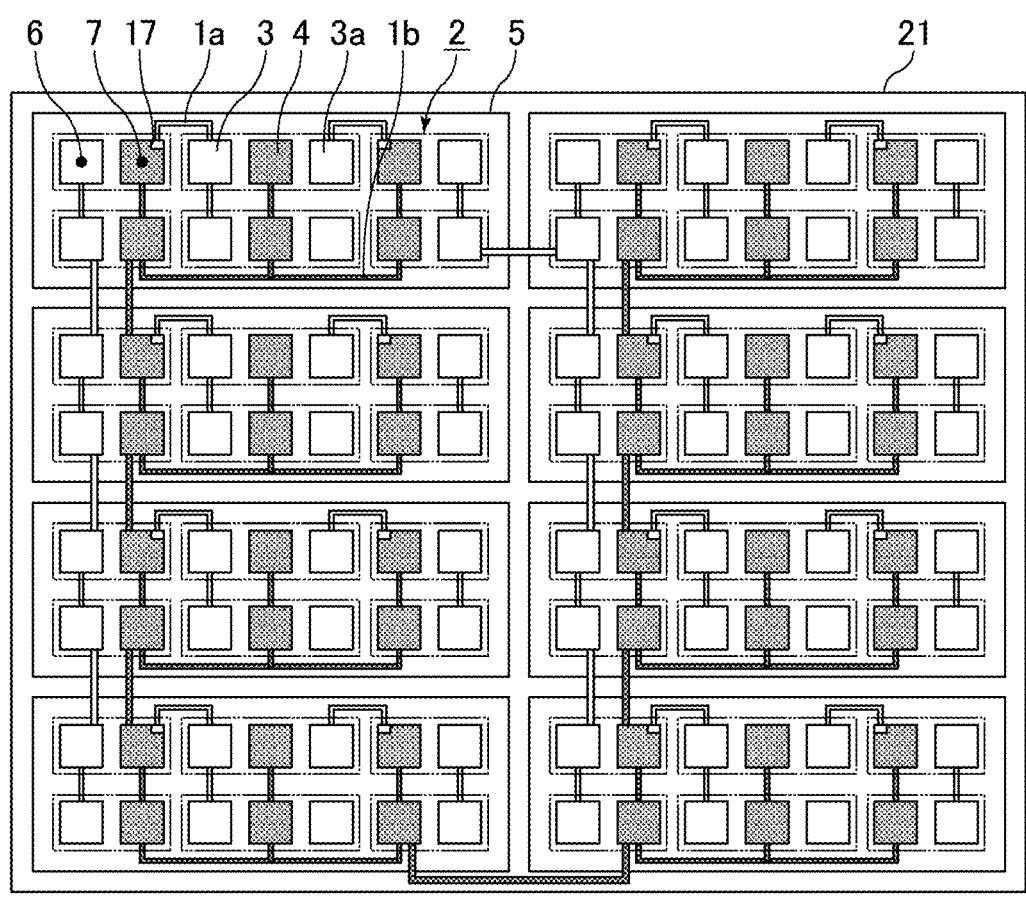
FIG. 24 is a plan view schematically illustrating an example of an aggregation of integrated capacitors.

FIG. 24 is a plan view schematically illustrating an example of an aggregation of integrated capacitors.

In the example illustrated in FIG. 24, a voltage can be applied across the electrodes of all capacitor elements 2 included in an aggregation 21 of integrated capacitors by applying the voltage across the voltage application point 6 of any one of the first external electrode layers 3 and the voltage application point 7 of any one of the second external electrode layers 4 when the plurality of first external electrode layers 3 are electrically coupled to each other and the plurality of second external electrode layers 4 are electrically coupled to each other in the aggregation 21 of integrated capacitors. It should be noted that the voltage application point 6 of the first external electrode layer 3 and the voltage application point 7 of the second external electrode layer 4 may be the electrodes of a single capacitor element 2 or the electrodes of different capacitor elements 2. Alternatively, the third external electrode layer may be used as the voltage application point 6 of the first external electrode layer 3, and the fourth external electrode layer may be used as the voltage application point 7 of the second external electrode layer 4. Furthermore, the dummy electrode layer may be used to couple the first external electrode layers 3 to each other or the second external electrode layers 4 to each other.

After the voltage is applied, it is possible to easily return to the state in which individual capacitor elements are made independent by fusion-cutting the first wiring and the second wiring with laser light or the like. Furthermore, the aggregation of integrated capacitors can be cut to dice the aggregation into individual integrated capacitors. A method such as dicing is used to cut the aggregation of integrated capacitors. The aggregation of integrated capacitors may be cut before or after the first wiring and the second wiring are cut.

In the seventh embodiment of the present invention, since a voltage can be applied with a plurality of aggregations of capacitor elements disposed, two voltage application points only need to be provided regardless of the number of capacitor elements included in the integrated capacitor. Accordingly, a voltage can be applied to all capacitor elements by using simpler jigs and methods, so that the manufacturing cost can be further reduced.

Eighth Embodiment

Although the first wiring and the second wiring are cut by a laser in the first to seventh embodiments of the present invention, the first wiring and the second wiring may be cut mechanically. For example, a micro drill may be used to cut the first wiring and the second wiring. The effect described in the first embodiment of the present invention can also be obtained by using a relatively inexpensive mechanical cutting machine without using an expensive machine for fusion-cutting with laser light.

The integrated capacitor and the method of manufacturing an integrated capacitor according to the present invention are not limited to the embodiments described above, and various applications and modifications regarding the structures and the manufacturing conditions of an integrated capacitor can be made within the scope of the present invention.

For example, when the plurality of first external electrode layers are provided on the front and back surfaces of the exterior body, the first wiring for electrically coupling the first external electrode layers to each other may be provided only on the front surface, only on the back surface, or on both the front and back surfaces of the exterior body. That is, the first wiring may be provided on a single surface or different surfaces of the outer surfaces of the exterior body. Similarly, when the plurality of second external electrode layers are provided on the front and back surfaces of the exterior body, the second wiring for electrically coupling the second external electrode layers to each other may be provided only on the front surface, only on the back surface, or on both the front and back surfaces of the exterior body.

That is, the second wiring may be provided on a single surface or different surfaces of the outer surfaces of the exterior body.

REFERENCE SIGNS LIST 1a first wiring
1b second wiring
2 capacitor element
2a first capacitor element
2b second capacitor element
2c third capacitor element
2d fourth capacitor element
2e fifth capacitor element
2f sixth capacitor element
3 first external electrode layer
3a third external electrode layer
4 second external electrode layer
5 aggregation of capacitor elements
5A, 5B, 5C, 5D, 5E, 5F integrated capacitor
6 voltage application point of first external electrode layer
7 voltage application point of second external electrode layer
8 first internal electrode
9 second internal electrode
10 connection through-hole
11 connection via conductor
12, 20 exterior body
13 wiring cut position
14 depressed portion
15 projecting portion
15a recessed portion
16 connection path
17 dummy electrode layer
18 first wiring unnecessary position
19 material layer having lower laser absorbance
21 aggregation of integrated capacitors
22 conductive polymer layer
23 wiring cut unnecessary position

The invention claimed is:

1. An integrated capacitor comprising:
a plurality of capacitor elements each having a first internal electrode and a second internal electrode;
an exterior body accommodating the plurality of capacitor elements;
a plurality of first external electrode layers on an outer surface of the exterior body, the first external electrode layers being electrically connected to the first internal electrodes of the plurality of capacitor elements, respectively; and
a plurality of second external electrode layers on the outer surface of the exterior body, the second external electrode layers being electrically connected to the second internal electrodes of the plurality of the capacitor elements, respectively,
wherein one of the first external electrode layers of at least a first capacitor element of the plurality of capacitor elements has a projecting portion projecting outward or a recessed portion recessed inward from part of an outer edge of the first external electrode layer in a plan view in a thickness direction of the first external electrode layer,
wherein the one first external electrode layer of the first capacitor element has the projecting portion, and
wherein the integrated capacitor further comprises:

an extension line extending from the projecting portion of the first external electrode layer of the first capacitor element in a direction in which the projecting portion projects; and
a material layer having a lower laser absorbance than the projecting portion on the outer surface of the exterior body and the extension line.
2. The integrated capacitor according to claim 1, further comprising:
a third external electrode layer on the outer surface of the exterior body, the third external electrode layer being electrically connected to the first internal electrode of the first capacitor element.
3. The integrated capacitor according to claim 2, wherein the third external electrode layer of the first capacitor element has a projecting portion projecting outward or a recessed portion recessed inward from part of an outer edge of the third external electrode layer in the plan view in the thickness direction of the third external electrode layer.
4. The integrated capacitor according to claim 1, further comprising:
a dummy electrode layer on the outer surface of the exterior body, the dummy electrode layer being electrically connected to the first internal electrode of a second capacitor element adjacent to the first capacitor element of the plurality of capacitor elements,
wherein the dummy electrode layer of the second capacitor element is adjacent to the first external electrode layer of the first capacitor element.
5. The integrated capacitor according to claim 1, wherein the exterior body is made of a material having a laser transmittance of 90% or higher.
6. The integrated capacitor according to claim 1, wherein the exterior body is made of glass.
7. The integrated capacitor according to claim 1, wherein the exterior body is made of a resin.
8. The integrated capacitor according to claim 1, wherein the one of the first external electrode layers has the projecting portion projecting outward or the recessed portion recessed inward from only the part of the outer edge of the first external electrode layer in the plan view in the thickness direction of the first external electrode layer.
9. An integrated capacitor comprising:
a plurality of capacitor elements each having a first internal electrode and a second internal electrode;
an exterior body accommodating the plurality of capacitor elements;
a plurality of first external electrode layers on an outer surface of the exterior body, the first external electrode layers being electrically connected to the first internal electrodes of the plurality of capacitor elements, respectively;
a plurality of second external electrode layers on the outer surface of the exterior body, the second external electrode layers being electrically connected to the second internal electrodes of the plurality of the capacitor elements, respectively,
wherein one of the first external electrode layers of at least a first capacitor element of the plurality of capacitor elements has a projecting portion projecting outward or a recessed portion recessed inward from part of an outer edge of the first external electrode layer in a plan view in a thickness direction of the first external electrode layer, and
wherein the integrated capacitor further comprises a depressed portion in the outer surface of the exterior body, the depressed portion located on an extension line extending from the projecting portion of the first external electrode layer in a direction in which the projecting portion projects or in an extension line extending from the projecting portion in a direction opposite to a direction in which the recessed portion of the first external electrode layer is recessed.

10. The integrated capacitor according to claim 9, wherein the first internal electrode or the second internal electrode of the first capacitor element overlaps the depressed portion in the plan view in the thickness direction of the first external electrode layer of the first capacitor element.

11. An integrated capacitor comprising:

a plurality of capacitor elements each having a first internal electrode and a second internal electrode;

an exterior body accommodating the plurality of capacitor elements;

a plurality of first external electrode layers on an outer surface of the exterior body, the first external electrode layers being electrically connected to the first internal electrodes of the plurality of capacitor elements, respectively; and a plurality of second external electrode layers on the outer surface of the exterior body, the second external electrode layers being electrically connected to the second internal electrodes of the plurality of the capacitor elements, respectively, wherein one of the first external electrode layers of at least a first capacitor element of the plurality of capacitor elements has a projecting portion projecting outward or a recessed portion recessed inward from part of an outer edge of the first external electrode layer in a plan view in a thickness direction of the first external electrode layer, and wherein the plurality of capacitor elements are electrolytic capacitors.

* * * * *